United States Patent [19]

Russo, III

[11] Patent Number: 4,803,839

[45] Date of Patent: Feb. 14, 1989

[54] APPARATUS FOR CONVERTING OCEAN MOTION TO USEABLE ENERGY

[76] Inventor: Baldassare Russo, III, 4461 - 137th S.E., Bellevue, Wash. 98006

[21] Appl. No.: 138,592

[22] Filed: Dec. 28, 1987

[51] Int. Cl.$^4$ .............................................. F03B 13/12
[52] U.S. Cl. ...................................... 60/501; 60/502; 60/504; 60/507
[58] Field of Search .................................... 60/497–507

[56] References Cited

U.S. PATENT DOCUMENTS

| | | |
|---|---|---|
| 1,018,678 | 2/1912 | Nelson. |
| 1,033,476 | 7/1912 | Schulze ................................ 60/501 |
| 1,303,897 | 5/1919 | Heckerman ........................ 60/504 |
| 1,540,364 | 6/1925 | Roldan. |
| 1,928,986 | 10/1933 | Snell .................................... 60/505 |
| 2,783,022 | 2/1957 | Salzer. |
| 3,204,110 | 8/1965 | Masuda. |
| 3,911,287 | 10/1975 | Neville. |
| 3,965,365 | 6/1976 | Parr. |
| 4,242,593 | 12/1980 | Quilico et al.. |
| 4,281,275 | 7/1981 | Testa et al.. |
| 4,285,196 | 8/1981 | Ekstrom et al. ................ 60/501 X |
| 4,319,454 | 3/1982 | Lucia. |
| 4,389,843 | 6/1983 | Lamberti ........................ 60/506 X |
| 4,392,060 | 7/1983 | Ivy. |
| 4,598,547 | 7/1986 | Danihel ............................ 60/504 X |

OTHER PUBLICATIONS p. 1823, Office Gazette of the United States Patent and Trademark Office, Jul. 31, 1984 (Patent No. 4,462,211).

*Primary Examiner*—Allen M. Ostrager
*Attorney, Agent, or Firm*—Seed and Berry

[57] ABSTRACT

Apparatus is disclosed for converting ocean wave motion to useable electrical energy. A float is mounted to a raft in a manner to permit movement of the float, relative to the raft, in response to ocean wave motion. An upward drive mechanism is responsive to upward motion of the float to rotate a shaft in a predetermined direction. A downward drive mechanism is responsive to downward motion of the float to rotate the shaft in the same predetermined direction. A conventional electrical generator is coupled to the shaft for converting the rotation of the shaft to electrical energy. In another embodiment the float is adapted to be dropped from an initial position above the surface of a body of water toward the water. A motor cooperates with a control assembly to lift the float from a pickup position to its initial position such that the float may again fall.

12 Claims, 6 Drawing Sheets

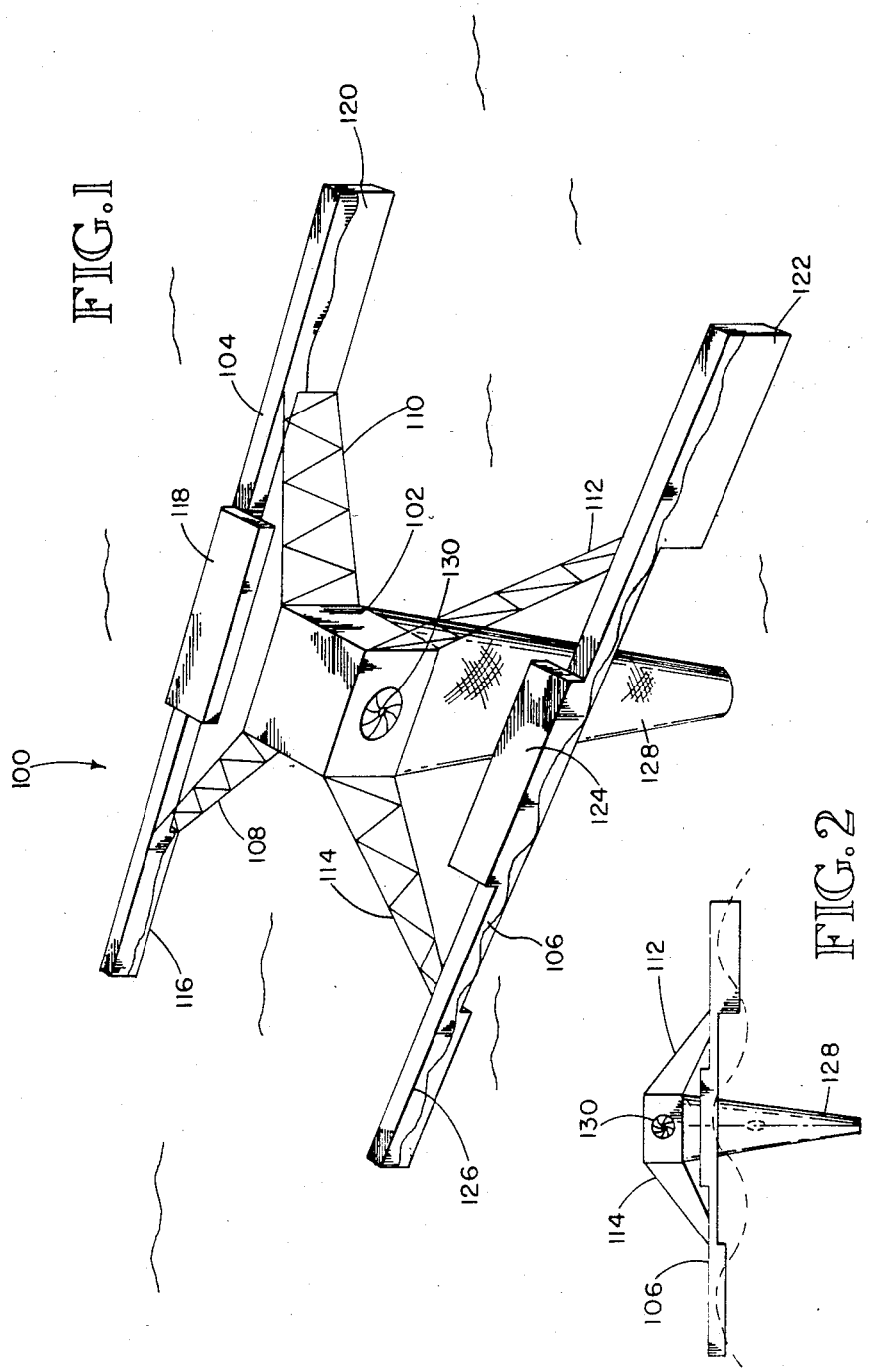

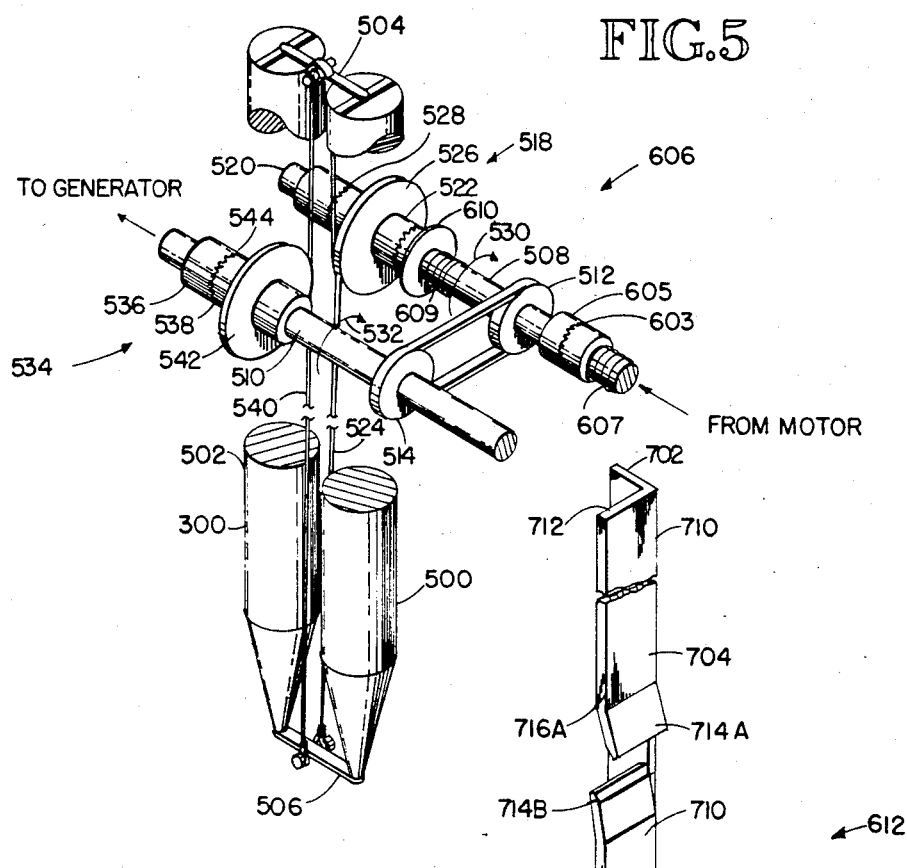
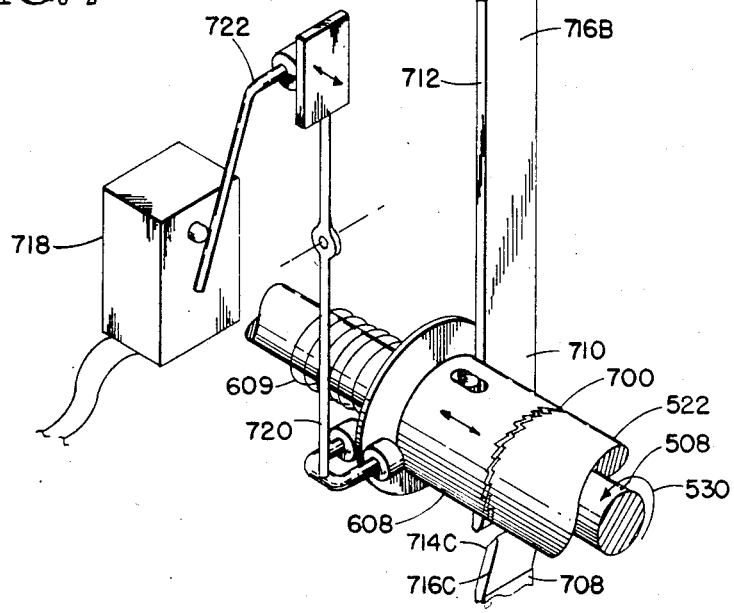

APPARATUS FOR CONVERTING OCEAN MOTION TO USEABLE ENERGY

1. Technical Field

The present invention is directed toward electrical generating apparatus and, more particularly, toward apparatus for converting the motion of ocean waves and other motion to useable electrical energy.

2. Background of the Invention

It is always desirable to provide new sources of energy. The continuous water movements on the earth surface release enormous energy which can provide a constant source if only it could be harnessed. The present invention provides method and apparatus for converting the energy released by the continuous water movements on the earth surface to useable forms of energy.

Further, the present invention provides apparatus for converting the motion of a float falling in a body of water to useable energy. Alternate embodiments of the invention are disclosed which provide a closed loop system for continuous generation of electricity.

Disclosure of the Invention

Apparatus is disclosed for converting ocean wave motion to useable electrical energy. The apparatus includes a gear housing mounted to a floatable raft which supports the gear housing. The raft includes buoyant flotation members which extend over a length which is sufficient to span a plurality of ocean waves such that vertical movement of the raft is substantially independent of the ocean wave motion. A float is mounted to the gear housing for floating in the ocean and providing motion relative to the raft and gear housing in response to the rise and fall of each ocean wave. A float guide assembly restricts the motion of the float to bi-directional, substantially vertical motion. A shaft is also provided and is rotatably supported by the gear housing. First and second means are mounted to the shaft wherein the first means is adapted to rotate the shaft in a predetermined direction in response to upward motion of the float and wherein the second means is adapted to rotate the shaft in the same predetermined direction in response to downward motion of the float. A conversion apparatus which includes an electrical generator is responsive to rotation of the shaft in the predetermined direction for converting the rotation into electrical energy.

In an alternate embodiment, the float and gear housing are mounted to a fixed support frame above the water surface. The float is adapted to be dropped into the water from a raised initial position and continue downward under the influence of gravity until the buoyancy of the float provides an upward force on the float. Thereafter, the float moves upward under the force of its buoyancy to a raised second position beneath the initial position and at the apex of its upward buoyant movement. A motor is provided for lifting the float from the second position to the initial position to place the float in position for being released again. Control means are included which activate the motor when the float reaches the apex of its buoyant movement and simultaneously engage the motor with the first means to lift the float toward the initial position. When the float is returned to its initial position, the motor is deactivated and the first means disengaged from the shaft such that the float is again free to drop in the direction of the water's surface.

Further embodiments of the novel apparatus for converting motion to useable energy include versions of the invention wherein other forms of energy are used that provide an effect similar to the buoyancy provided by water.

The apparatus which is considered to be the invention is particularly pointed out and distinctly claimed in the numbered paragraphs appended hereto. The invention, however, may best be understood from a reading of the following detailed description taken in conjunction with the drawings.

DETAILED DESCRIPTION OF THE DRAWINGS

FIG. 1 is a perspective view of the apparatus which comprises the subject invention.

FIG. 2 is a reduced scale side view of the apparatus illustrated in FIG. 1.

FIG. 5 is a fragmentary, perspective view of alternate conversion mechanism.

FIG. 7 is an enlarged, fragmentary, perspective view of the motor switching portion of the alternate conversion mechanism of FIG. 5.

BEST MODE FOR CARRYING OUT THE INVENTION

Figure 3:
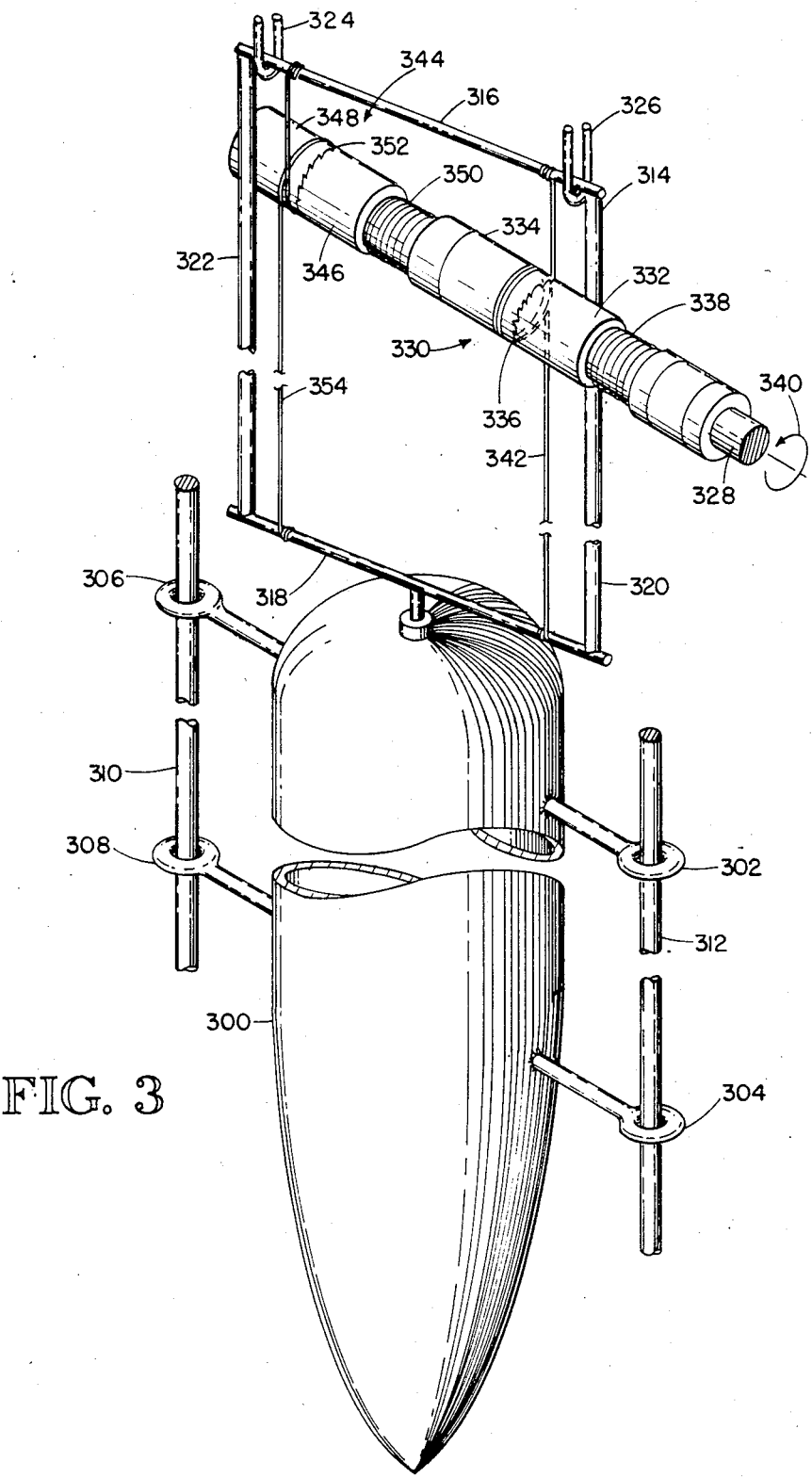
FIG. 3 is an enlarged, fragmentary, perspective view of a portion of the energy conversion mechanism which comprises the apparatus illustrated in FIG. 1.

Apparatus for converting ocean motion to useable electrical energy is illustrated in the perspective drawing of FIG. 1. Therein, a raft 100 is provided for supporting a gear housing 102. The gear housing is provided for mounting the apparatus which converts the ocean wave motion to useable electrical energy as will be described more fully below. Raft 100 include first and second elongate support arms 104 and 106 each fixedly coupled to opposite sides of gear housing 102 by a plurality of trestled struts 108–114. In the presently preferred embodiments, support arms 104 and 106 as well as trestled struts 108–114 are each made of a light rigid material such as, for example, aluminum. It will be appreciated, however, by those skilled in the art, that the support arms and the trestled struts may be comprised of a variety of rigid materials.

Each support arm includes a plurality of supporting buoys 116–126. The supporting buoys are spaced along the length of the support arm for adding buoyancy to the balsa raft 100. In the presently preferred embodiment, each supporting buoy 116–126 is comprised of wood for buoyantly supporting the support arms 104 and 106. It will be apparent, however, to those skilled in the art, that the supporting buoys 116–126 may be comprised of a plurality of buoyant materials for buoyantly supporting the balsa raft 100 over the surface of the ocean.

The raft 100 further includes a downwardly projecting cone shaped screen 128 for preventing the influx of foreign material, e.g., seaweed, fish, dirt, etc., to the gear housing 102.

An optical spiral 130 is visible in the gear box housing. The optical spiral is coupled to a conversion mechanism which will be described below, for visually indicating proper operation of the mechanism.

With reference to FIG. 3, there is provided a more detailed illustration of the energy conversion apparatus which is mounted within the gear housing 102. An elongated cylindrical float 300 is constructed to float in the ocean. The float 300 has a diameter which is substantially less than the length of the support arms 104 and 106 such that the motion of the float 300 is substantially dependent upon the motion of each ocean wave and independent of the motion of the raft 100. The float 300 includes a plurality of guides 302-308 which cooperate with a pair of vertical guide rails 310 and 312 for restricting the motion of the float 300 to bi-directional substantially vertical movement. The guide rails 310 and 312 may be connected to the gear housing 102 by any means known in the art.

A frame 314 is fixedly connected to the top of the float for vertical travel therewith. The frame includes a pair of spaced apart horizontal support members 316 and 318 joined by a pair of spaced apart vertical support members 320 and 322 to form a substantially rectangular structure. The frame may include motion restraining members 324 and 326, coupled to the gear housing 102, to help in restricting the motion of the frame to substantially vertical motion.

Figure 4:
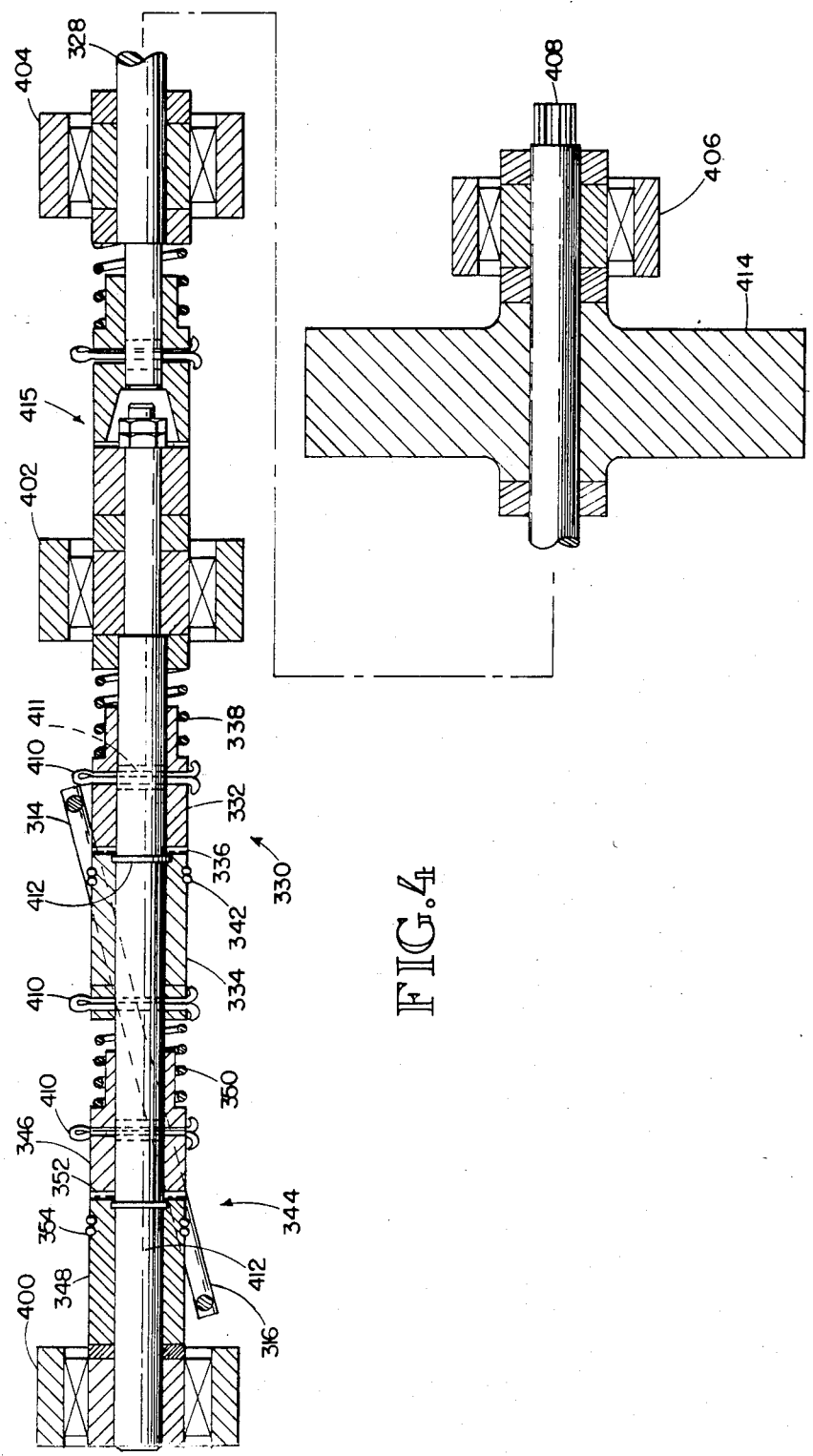
FIG. 4 is a sectional view of the shaft illustrated in FIG. 3.

As best shown in FIG. 4, a shaft 328 is rotatably supported by a plurality of bearing supports 400-406 which are mounted to the gear housing 102. The shaft is positioned above the float 300 and is driven by the up and down vertical motion of the float 300 as will be explained more fully below. The shaft includes a splined nub 408 which is couplable to conventional energy conversion means, such as, for example an electrical generator (not shown), for converting the rotation of the shaft 328 to useable electrical energy. The energy conversion means may also be supported within the gear housing 102.

The shaft 328 has mounted thereto an upward drive mechanism 330 for converting the upward motion of the float 300 into rotation of the shaft 328 in a counterclockwise direction as viewed in FIG. 3 and indicated by arrow 340. The upward drive mechanism includes a first member 332 which is slidably mounted on the shaft 328 to permit at least limited longitudinal movement of the first member 332 along the shaft and to prevent rotation of the first member relative to the shaft by a conventional coupling means such as a cotter pin 410 and elongated shaft groove 411. A second member 334 is rotatably mounted on the shaft 328 to permit rotation of the second member relative to the shaft. The second member and the shaft include means which cooperate to prevent longitudinal movement of the second member along the shaft, such as the key interlocking groove 412 illustrated in FIG. 4.

The first member and the second member also include ratchet type teeth 336 on opposing faces thereof which are matingly engagable. A spring 338 is mounted on the shaft for biasing the first member 332 toward the second member 334. The ratchet type teeth 336 are constructed such that when the second member 334 is rotating in the counterclockwise direction of the arrow 340, the teeth 336 engage such that the first member 332, and hence the shaft 328 are also rotated by the second member 334 in the counterclockwise direction. Further, when the second member is rotating in a clockwise direction opposite to that of arrow 340, the teeth 336 slip and are disengaged and the first and second members are free to rotate relative to one another.

The upward drive mechanism 330 further includes a flexible cable 342 which is securely coupled by its ends to the horizontal support members 316 and 318. The cable 342 is further wound around the second member 334 for rotating the second member in response to vertical motion of the cable frame 314. As is illustrated in the drawing, the cable is wound such that upward motion of the cable frame 314 caused by the float 300 rising results in rotation of the second member 334 in the counterclockwise direction of the arrow 340 and, therefore, results in rotation of the shaft 328 in the same counterclockwise direction. Further, downward motion of the cable frame 314 results in rotation of the second member 334 in a clockwise direction opposite to that of the arrow 340 resulting in disengagement of the second member from the first member.

A downward drive mechanism 344 is provided for converting the downward motion of the float 300 into rotation of the shaft in the counterclockwise direction of the arrow 340 and includes a first member 346 which is slidably mounted to the shaft 328 in the same manner as the first member 332. Similarly, a second member 348 is rotatably mounted to the shaft 328 in the same manner as the second member 334. A spring 350 is also mounted to the shaft for biasing the first member 346 toward the second member 348 in the same manner as the spring 338. The first and second members 346 and 348 further include ratchet type teeth 352 which, like the teeth 336, are constructed for mating engagement when the second member 348 is rotating in the counterclockwise direction of the arrow 340 and are constructed to slip and be disengaged when the second member 348 is rotating in a clockwise direction opposite to that of the arrow 340.

The downward drive mechanism 344 also includes a flexible cable 354 which is securely coupled by its ends to the horizontal support members 316 and 318. The cable 354 is wound around the second member 348 such that downward movement of the cable frame 314 caused by the float 300 falling results in counterclockwise rotation of the second member 348 in the direction of the arrow 340, and hence, rotation of the first member 346 and the shaft 328 in the same counterclockwise direction. Conversely, upward motion of the cable frame 314 results in rotation of the second member 348 in a clockwise direction opposite to that of the arrow 340 such that the first and second members 346 and 348 are disengaged and the movement of the shaft 328 is independent of the movement of the second member 348.

As such, the upward drive mechanism 330 and the downward drive mechanism 344 therefore cooperate to provide constant uni-directional drive force to the shaft 328 in the direction of the arrow 340 in response to both the rising and falling vertical motion of the float 300 as it responds to wave action.

With reference to FIG. 4, the shaft 328 further includes a flywheel 414 to store rotational energy to provide an averaging to the rotation of the shaft 328 in response to erratic movement of the float 300. Another ratchet-type assembly 415 is provided as a safety disconnect and has ratchet-type teeth that allow the flywheel to keep rotating even when the drive mechanisms 330 and 344 are not working.

Figure 6:
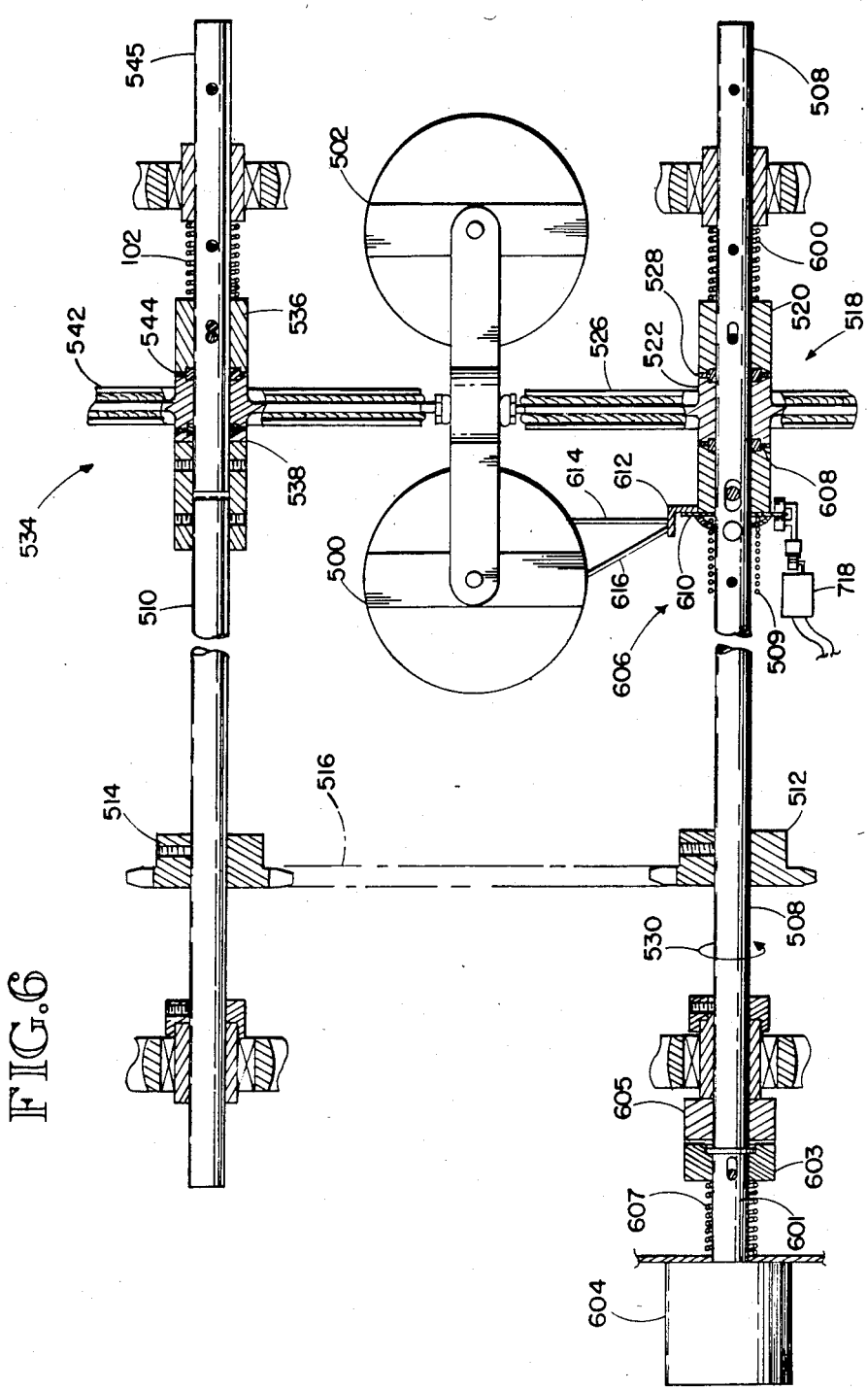
FIG. 6 is a sectional view of the shaft illustrated in FIG. 5.

An alternate embodiment of the invention is illustrated in FIGS. 5, 6 and 7. Therein, the float 300 comprises a pair of generally cylindrical weighted floating units 500 and 502. The cable frame 314 comprises spaced horizontal supporting members 504 and 506 which extend between and are joined to the top and bottom of the floating units 500 and 502. The two cooperating shafts 508 and 510 are interconnected by coupling pulleys 512 and 514 and a coupling belt 516, and in combination the shafts 508 and 510 perform the same function as performed by the shaft 328 of the prior embodiment.

In a manner similar to the embodiment of FIGS. 3 and 4, the conversion apparatus shown in FIGS. 5 and 6 includes an upward drive mechanism 518 comprised of a first member 520, a second member 522, a spring 600 for biasing the first member toward the second member, and a cable 524. The cable 524 is wound around a sheave type pulley 526 which is connected to the second member 522 for rotation therewith, instead of being wound around the second member itself (as in the embodiment of FIGS. 3 and 4). The first and second members of the upward drive mechanism 518 include ratchet type teeth 528 which, in combination with the spring 600, cooperate to engage when the first and second members are both moving in the clockwise direction indicated by the arrow 530 in FIG. 5. The cable 524 is wound around the sheave 526 in a manner such that the upward movement of the floating units 500 and 502 rotates the second member 520 in the clockwise direction of the arrow 530 and hence results in a clockwise driving force being applied to the shaft 508, and through the coupling belt 516 to the shaft 510 to rotate the shaft 510 in the clockwise direction shown by the arrow 532 in FIG. 5.

A downward drive mechanism 534 is comprised of a first member 536, second member 538, a spring 602 for biasing the first member toward the second member, and a cable 540. The cable 540 is wound around a sheave pulley 542 which is connected to the second member 538 for rotation therewith. The first and second members of the downward drive mechanism 534 include ratchet type teeth 544 which, in combination with the spring 602, cooperate to engage when the first and second members are both moving in the clockwise direction of the arrow 532. The cable 540 is wound around the sheave 542 in a manner such that the downward movement of the floating units 500 and 502 rotates the second member 538 in the clockwise direction of the arrow 532 and hence results in a clockwise driving force being applied to the shaft 510 to rotate the shaft in the direction shown by the arrow 532. This also tends to cause clockwise rotation of the shaft 508, but the ratchet-type teeth of the first and second members 520 and 522 slip relative to each other.

As in the conversion mechanism illustrated in FIGS. 3 and 4, the conversion apparatus illustrated in FIGS. 5 and 6 includes means (not shown) for coupling the shaft 510 at an end 545 to a conventional energy conversion means such as an electrical generator (not shown) for converting the rotation of the shaft 510 to electrical energy. Although the invention is described and illustrated as having means for coupling the shaft 510 to the electrical generator, the shaft 508 could be coupled to the generator instead.

It will be apparent to those skilled in the art that the arrangement of FIGS. 5 and 6 described above may be readily substituted for the arrangement of FIGS. 3 and 4 (in whole or in part) without departing from the true scope and spirit of the invention. As an example, the float 300 of FIG. 3 can be readily replaced by a dual unit float as shown in FIG. 5. Similarly, the single shaft arrangement shown in FIGS. 3 and 4 can be replaced by the dual shaft arrangement as illustrated in FIGS. 5 and 6. The sheave pulleys shown in FIGS. 5 and 6 can be readily added to the structure shown in FIG. 3. Many combinations and similar substitutions will readily become apparent to those skilled in the art.

While the embodiment of FIGS. 5 and 6 can be used for converting the wave motion of the ocean to electricity as the apparatus illustrated in FIGS. 1-3, the embodiment of FIGS. 5 and 6 is further adapted for use in still water to generate electricity. In such an application, the shafts 508 and 510 may be connected to a frame (not shown) located above a body of water either supported by a raft or tower. The float 300 comprised of the floating units 500 and 502, is adapted to be dropped from an initial raised position with its equilibrium flotation point above the surface of the water, and falls in the direction toward the water. During the downward movement of the float, the downward drive mechanism 534 supplies a force to rotate the shafts 508 and 510 in the direction of the arrows 530 and 532 to rotate the electrical generator and produce electricity.

The float continues to fall after its equilibrium flotation point passes below the surface of the water due to the momentum which has been generated during the initial portion of its fall. The float continues to fall to a bottom position at which the buoyancy of the float is sufficient to terminate the fall and to start the float's travel in the upward direction. During the entire time that the float is falling, the downward drive mechanism is converting energy from the falling float to rotation of the shaft 510 and hence electricity.

When the float reaches the bottom position, buoyant forces begin to urge the float upward. The float begins to move upward and the upward drive mechanism 518 converts energy of the upward movement of the float to rotation of the shafts 508 and 510 and hence electricity. The float again passes beyond the equilibrium flotation point to a pickup position, which is, of course, below the initial position. A motor 604 and a control switch 606 are provided to rotate the shaft 508 and turn the sheave 526 in the clockwise direction of arrow 530 to wind the cable 524 about the sheave and thereby lift the float from the pickup position to the initial position so that the cycle may be repeated.

The motor 604 includes a motor shaft 601 which is drivingly coupled to the shaft 508 by a first member 603, a second member 605 and a spring 607. The first member 603 is connected to the shaft 601 in the same manner as the first members 520 and 536, i.e., for rotation with the shaft and for at least limited longitudinal movement along the shaft. The second member 605 is fixedly connected to the shaft 508. The spring 607 biases the first member toward the second member. The first and second members include ratchet type teeth on opposing faces thereof. The motor 604 is adapted for selectively rotating the shaft in the direction of the arrow 530 to lift the float. The ratchet-type teeth of the first and second members 603 and 605 slip with respect to each other when the drive mechanisms 518 and 534 are causing rotation of the shaft 508 to effectively disconnect the motor 604 from the shaft.

The control switch 606, best shown in FIG. 7, includes a first member 608 which is mounted to the shaft 508 in the same manner as the first members 520 and 536. The first member 608 has a disk fixedly connected thereto for longitudinal movement therewith. A switch control bar guide 612 is connected to the one floating unit 500, by a pair of supporting struts 614 and 616, for vertical movement therewith (see FIG. 6). The switch control guide 612 is provided for engaging the disk 610 to allow a spring 609 to urge the first member 608 toward the second member 522 of the upward drive mechanism 518 as the float 300 is moving upward and approaches the pickup position, as will be described more fully below.

The first member 608 and the second member 522 include teeth 700 (see FIG. 7) on opposing faces thereof which cooperate when the first member 608 and the second member 522 are urged together to move the first member and the second member in the same clockwise direction 530 (shown in FIG. 7 from a viewing direction opposite to that of FIG. 5). As the float approaches the pickup position, the first member 608 is urged toward the second member 522 such that the teeth 700 engage and the rotational force supplied to the shaft 508 by the motor 604 is transferred by the first member 608 to the second member 522 to rotate the second member 522 in the clockwise direction of the arrow 530 and to thereby lift the float 300 toward the initial starting position. When the float reaches the initial position, the switch control guide 512 causes the first member 608 to be disengaged from the second member 522 so that the float may fall freely and repeat the cycle just described.

The switch control guide 612 for moving the first member 608 into and out of engagement with the second member 522 is shown in detail in FIG. 7. The switch control guide includes an elongated angle guide bar 702 having upper, midportion and lower disk engaging segments 704, 706 and 708, respectively. The disk engaging portion of the elongated guide bar 702 has first and second sides 710 and 712, respectively. Each of the disk engaging segments include a projecting portion 714 and a vertical guide portion 716.

The projecting portions 714a and 714b of the upper and midportion disk engaging segments 704 and 706 are provided for engaging the disk 610 when the float 300, and hence, the guide bar 702, is moving upward toward the pickup position from the bottom position. The projecting portions 714a and 714b move the disk 610 from the second side of the disk support member to the first side of the disk support members, thus causing movement of the first member 608 into engagement with the second member 522 such that the motor 604 provides rotational drive force to the second member 522 to lift the float from the pickup position to the initial position.

As the float, and hence the guide bar 702, is being lifted, the disk 610 is guided along the first side of the guide bar 702 along the guide portion 716b of the midportion disk engaging segment 706 and thereby maintains engagement of the first member 608 and the second member 522. As the float approaches the initial position, the disk 610 engages the projecting portion 714c of the lower disk engaging segment 708 and is moved from the first side 710 of the guide bar 702 to the second side 712 thereof, thus causing the first member 608 to move out of engagement with the second member 522 such that the float 300 immediately begins to fall.

As the float 300 falls to the bottom position, the guide bar 702 moves downward relative to the disk 610 and the disk is guided along the second side 712 of the guide bar 702 (as shown in FIG. 7). When the float reaches the bottom position, the guide bar will have fallen to position the disk 610 at the upper disk engaging segment 704 (on the second side 712 thereof), above the projecting portion 714a. The guide bar 702 then begins to move upward toward the float pickup position and the disk is guided along the second side of the upper disk engaging segment 704 until the float reaches the pickup position and the disk is again moved to the first side of the guide bar by the projecting members 714a and 714b of the upper and midportion disk engaging members 704 and 706.

In a further enhancement to the embodiment of FIGS. 5-7, a switch 718 is turned on and off by the disk 610 via a lever arm and a lever 722. The switch is provided for activating the motor 604 at the time when the float reaches the pickup position and the disk 610 is moved from the second side 712 of the guide bar 702 to the first side 710. In similar fashion, the motor is deactivated when the float reaches the initial position and the disk is moved from the first side of the guide bar to the second side when the float is allowed to fall freely.

Figure 8:
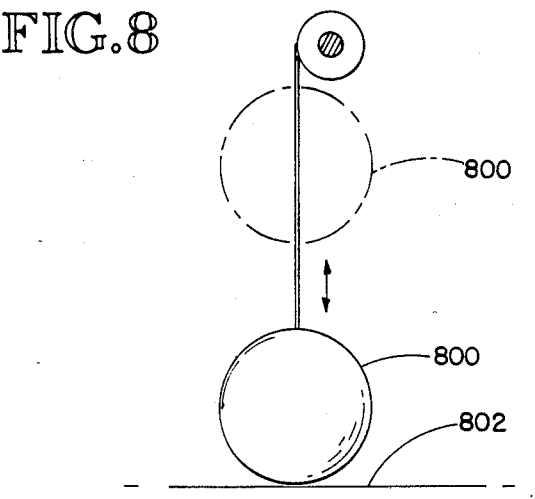
FIG. 8 is a perspective view of another embodiment of the present invention.

Many other materials and arrangements could be used to implement the embodiment of the invention described above by reference to FIGS. 5-7. As an example, FIG. 8 illustrates an embodiment wherein a rubber ball 800 is dropped from an elevated position (shown in phantom line) toward a hard surface 802 and bounces therefrom. In the embodiment of FIG. 8 the elasticity of the rubber ball provides a return force to the ball which is similar to the return force supplied to the float by the buoyancy of the water. Apparatus similar to the apparatus described by reference to FIGS. 5-7, may be combined with the ball and surface of FIG. 8 to convert the energy of the falling and rising ball to electricity and for returning the ball to its initial starting position. Alternatively, a hard ball may be used with a resilient surface to achieve the same result.

It will readily become apparent to those skilled in the art that many other objects and arrangements which cooperate to provide motive forces may be exchanged for the float and water described herein. Examples of such forces are buoyancy, magnetism and elasticity.

While only several presently preferred embodiments of my novel apparatus for converting ocean motion to useable energy have been disclosed in detail herein, many modifications and variations of the described embodiments exist which do not depart from the true scope and spirit of the invention. It is my intention, therefore, by the claims appended hereto, to include all such modifications and variations.

I claim:

1. Apparatus for converting water wave motion to useable electrical energy, comprising:
   a gear housing;
   raft means for buoyantly supporting said gear housing, said raft means having buoyant flotation members extending over a length sufficient to span a plurality of waves;
   a float for floating in the water and providing motion relative to said raft means in response to the rise and fall of waves;
   float guide means for restricting the motion of the float to bidirectional substantially vertical motion, said float guide means including a frame connected to said float for travel therewith and having a pair of spaced-apart, generally horizontal support members;

at least one shaft rotatably supported by said gear housing;

first means for converting upward motion of said float into rotation of said shaft in a predetermined rotational direction, said first means including:
(a) a second member rotatably mounted to said shaft to permit rotation of said second member relative to said shaft;
(b) a first member mounted to said shaft to prevent rotation of said first member relative to said shaft;
(c) first drive means for drivably rotating said first member in said predetermined direction in response to rotation of said second member in a first rotational direction, and for permitting rotation of said second member in a second rotational direction opposite said first rotational direction without drivably rotating said first member; and
(d) first flexible means for rotating said second member in said first rotational direction in response to upward motion of said float, said first flexible drive means including a first flexible elongated member;

second means for converting downward motion of said float into rotation of said shaft in said same predetermined rotational direction, said second means including:
(a) a fourth member rotatably mounted to said shaft to permit rotation of said fourth member relative to said shaft;
(b) a third member mounted to said shaft to prevent rotation of said third member relative to said shaft;
(c) second drive means for drivably rotating said third member in said predetermined direction in response to rotation of said fourth member in a third rotational direction, and for permitting rotation of said fourth member in a fourth rotational direction opposite said third rotational direction without drivably rotating said third member; and
(d) second flexible means for rotating said fourth member in said third rotational direction in response to downward motion of said float, said second flexible drive means including a second flexible elongated member, each said first and second flexible elongated members having a first end securely coupled to one of said support members and a second end securely coupled to the other said support members, said first elongated member being wound around said second member in a direction to rotate said second member in said first rotational direction in response to upward motion of said frame with said float and said second elongated member being wound around said fourth member in a direction to rotate said fourth member in said third rotational direction in response to downward motion of said frame with said float; and conversion means supportably mounted in said gear housing for converting the rotation of said shaft in said predetermined direction to useable electrical energy.

2. Apparatus as recited in claim 1 wherein each said first and second means comprises:
a second member rotatably mounted to said shaft to permit rotation of said second member relative to said shaft;
a first member slidably mounted on said shaft to permit longitudinal movement of said first member along said shaft and to prevent rotation of said first member relative to said shaft, said second member and said first member including ratchet teeth matingly engagable, said first member being longitudinally movable on said shaft between a first position with said first member ratchet teeth drivably engaging said second member ratchet teeth to rotate said first member in said predetermined direction, and a second position with said first member ratchet teeth and said second member ratchet teeth disengaged; and
means for biasing said first member into engagement with said second member, and wherein said first means includes means for rotating said second member of said first means in said predetermined direction in response to upward motion of said float and said second means includes means for rotating said second member of said second means in said predetermined direction in response to downward motion of said float 3. Apparatus as recited in claim 1 wherein said float guide means includes at least one substantially vertically oriented guide member supported by said gear housing, and at least one attachment member attached to said float for travel therewith and slidably engaging said guide member, said guide member and said attachment member providing a loose connection therebetween without meshing gears to restrain said float to substantially vertical motion without horizontal motion, whereby wave action will not cause binding between said guide member and said attachment member.

4. Apparatus as recited in claim 1 further, comprising means for protecting said float, said float guide means and said first and second means from contact with foreign matter which may be suspended in or floating on the water.

5. Apparatus as recited in claim 1 further, comprising:
motor means for selectively rotating said shaft to lift said float from a pickup position to a raised initial position; and
control means for selectively disengaging said motor from said shaft upon said float being raised to said initial position to release said float for a substantially free fall position, and engaging said motor with said shaft upon said float falling downward to a downwardmost position and then raising upward therefrom under its buoyancy to said pickup position below said initial position, whereby motor raises said float from said pickup position to said initial position so that it can be released again.

6. Apparatus as recited in claim 1 wherein said at least one shaft comprises first and second shafts associated with said first and second means, respectively, said apparatus further comprising
first and second coupling pulleys mounted respectively on said first and second shafts for rotation therewith, a coupling belt couplable to said first and second pulleys for synchronizing the motion of said first and second shafts.

7. Apparatus as recited in claim 5 wherein each said first and second means comprises:
a second member rotatably mounted to said shaft to permit rotation of said second member relative to said shaft;
a first member slidably mounted on said shaft to permit longitudinal movement of said first member along said shaft and to prevent rotation of said first member relative to said shaft, said second member and said first member including ratchet teeth matingly engagable, said first member being longitudinally movable on said shaft between a first position with said first member ratchet teeth drivably engaging said second member ratchet teeth to rotate said first member in said predetermined direction, and a second position with said first member ratchet teeth and said second member ratchet teeth disengaged; and means for biasing said first member into engagement with said second member, and wherein said first means includes means for rotating said second member of said first means in said predetermined direction in response to upward motion of said float and said second means includes means for rotating said second member of said second means in said predetermined direction in response t downward motion of said float 8. Apparatus as recited in claim 7 wherein said control means comprises:

a lift control member slidably mounted on said shaft to permit longitudinal movement of said control member between first and second positions along said shaft and to prevent rotation of said control member relative to said shaft, said second member of said first means and said control member including gear teeth matingly engagable when said control member is at the second position such that said control member teeth drivingly engage said second member of said first means to rotate the second member and lift said float; and means for moving said control member between the first and second positions, said control member being moved to the first position upon said float being raised to the pickup position and said control member being moved to the second position upon said float being raised to the initial position.

9. Apparatus as recited in claim 8 wherein said motor means comprises:

a motor for rotating said shaft; and switch means responsive to said control member for activating said motor when said control member is moved to the first position and for reactivating said motor when the control means is moved to the second position.

10. Apparatus for converting water wave motion to useable electrical energy, comprising:

a gear housing;

raft means for buoyantly supporting said gear housing, said raft means having buoyant flotation members extending over a length sufficient to span a plurality of waves;

a float for floating in the water and providing motion relative to said raft means in response to the rise and fall of the waves;

float guide means for restricting the motion of the float to bidirectional substantially vertical motion, said float guide means including a frame connected to said float (or travel therewith and having a pair of spaced apart, generally horizontal support members;

at least one shaft rotatably supported by said gear housing;

first means for converting upward motion of said float into rotation of said shaft in a predetermined rotational direction, said first means including:

(a) a second member rotatably mounted to said shaft to permit rotation of said second member relative to said shaft;

(b) a first member slidably mounted on said shaft to permit longitudinal movement of said first member along said shaft and to prevent rotation of said first member relative to said shaft, said second member having second member engagement means and said first member having first member engagement means for providing selective driving engagement therebetween, said first member being longitudinally movable on said shaft between a first position with said first member engagement means drivably engaging said second member engagement means to rotate said first member in said predetermined direction, and a second position with said first member engagement means and said second member engagement means disengaged;

(c) means for biasing said first member into engagement with said second member; and (d) first flexible drive means for rotating said second member in said predetermined direction in response to upward motion of said float, said first flexible drive means including a first flexible cable;

second means for converting downward motion of said float into rotation of said shaft in said same predetermined rotational direction, said second means including:

(a) a fourth member rotatably mounted to said shaft to permit rotation of said fourth member relative to said shaft;

(b) a third member slidably mounted to said shaft to permit longitudinal movement of said third member along said shaft and to prevent rotation of said third member relative to said shaft, said fourth member having fourth member engagement means and said third member having third member engagement means for providing elective driving engagement therebetween, said third member being longitudinally movable on said shaft between a first position with said third member engagement means drivably engaging said forth member engagement means to rotate said third member in said predetermined direction, and a second position with said third member engagement means and said fourth member engagement means disengaged;

(c) means for biasing said third member into engagement with said fourth member; and (d) second flexible drive means for rotating said fourth member in said predetermined direction in response to downward motion of said float, said second flexible drive means including a second flexible cable, each said first and second flexible cables having a first end securely coupled to one of said support members and a second end securely coupled to the other of said support members, said first cable being wound around said second member in a direction to rotate said second member in said predetermined direction in response to upward motion of said frame with said float and said second cable being wound around said fourth member in a direction to rotate said fourth member in said predetermined direction in response to downward motion of said frame with said float; and conversion means supportably mounted in said gear housing for converting the rotation of said shaft in said predetermined direction to useable electrical energy.

11. Apparatus for converting water wave motion to useable electrical energy, comprising:

a gear housing;

raft means for buoyantly supporting said gear housing, said raft means having buoyant flotation members extending over a length sufficient to span a plurality of waves, said raft means including a pair of buoyant flotation members spaced apart from each other with said gear housing positioned therebetween, and further including a plurality of trestled struts for rigidly connecting said flotation members to said gear housing, each said flotation member including an elongated support arm and at least two supporting buoys one positioned toward each end of said support arm for adding buoyancy to said support arm;

a float for floating in the water and providing motion relative to said raft means in response to the rise and fall of the waves;

float guide means for restricting the motion of the float to bidirectional substantially vertical motion;

at least one shaft rotatably supported by said gear housing;

first means for converting upward motion of said float into rotation of said shaft in a predetermined rotational direction;

second means for converting downward motion of said float into rotation of said shaft in said same predetermined rotational direction; and conversion means supportably mounted in said gear housing for converting the rotation of said shaft in said predetermined direction to useable electrical energy.

12. Apparatus as recited in claim 11 wherein said float comprises an elongated weighted floating cylinder for floating in the water, said cylinder having a diameter which is substantially less than the length of said support arms such that the motion of said float is substantially dependent upon the motion of each wave while the motion of said raft is substantially independent of the motion of the waves.

* * * * *

UNITED STATES PATENT AND TRADEMARK OFFICE
CERTIFICATE OF CORRECTION

PATENT NO.  : 4,803,839

DATED       : February 14, 1989

INVENTOR(S) : Baldassare Russo III

It is certified that error appears in the above-identified patent and that said Letters Patent is hereby corrected as shown below:

In claim 7, column 11, line 19, delete "t" and substitute therefor --to--.

In claim 8, column 11, line 21, delete "7" and substitute therefor --5--.

In claim 9, column 11, line 45, delete "reactivating" and substitute therefor --deactivating--.

In claim 10, column 11, line 61, delete "(or" and substitute therefor --for--.

In claim 11, column 13, line 6, delete "us ®able" and substitute therefor --useable--.

Signed and Sealed this
Twelfth Day of December, 1989

*Attest:*

JEFFREY M. SAMUELS

*Attesting Officer*   *Acting Commissioner of Patents and Trademarks*